United States Patent
Thielbar et al.

(10) Patent No.: US 11,159,595 B2
(45) Date of Patent: Oct. 26, 2021

(54) CONTEXTUAL LAYER FOR DIGITAL CONTENT

(71) Applicant: Sony Interactive Entertainment LLC, San Mateo, CA (US)

(72) Inventors: Christopher Thielbar, San Francisco, CA (US); Matthew Bloom-Carlin, San Francisco, CA (US); Yuji Tsuchikawa, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/280,211

(22) Filed: Feb. 20, 2019

(65) Prior Publication Data

US 2020/0267197 A1  Aug. 20, 2020

(51) Int. Cl.
*H04L 29/06* (2006.01)
*H04L 29/08* (2006.01)

(52) U.S. Cl.
CPC .......... *H04L 65/601* (2013.01); *H04L 67/303* (2013.01)

(58) Field of Classification Search
CPC . H04L 65/601; H04L 67/303; H04L 47/2458; H04L 45/3065; H04L 47/10; H04L 47/2408; H04L 65/80; H04L 45/14; B60K 2370/145; G01C 21/362;

(Continued)

(56) References Cited

U.S. PATENT DOCUMENTS 6,421,733 B1 * 7/2002 Tso ................ H04L 63/0428
                                                              709/246
2003/0038805 A1 * 2/2003 Wong ................ A63F 13/12
                                                              345/473

(Continued)

FOREIGN PATENT DOCUMENTS

WO    WO 2020/171968    8/2020

OTHER PUBLICATIONS

PCT Application No. PCT/US2020/017058 International Search Report and Written Opinion dated Mar. 31, 2020.

(Continued)

*Primary Examiner* — Ninos Donabed
(74) *Attorney, Agent, or Firm* — Polsinelli LLP

(57) ABSTRACT

Systems and methods for contextual layers for digital content are provided. Contextual information regarding a digital content stream may be stored in memory. Different sets of the contextual information may be associated with different predefined parts of the digital content stream. A request may be received from a user device over a communication network. Such request may concern context for a scene within the digital content stream, The scene may be identified as associated with at least one of the predefined parts of the digital content stream, One of the stored sets of contextual information may be retrieved based on the at least one predefined part of the digital content stream. A contextual layer may be generated based on the retrieved set of contextual information. Such contextual layer may include a presentation of the retrieved set of contextual information to be overlaid on at least part of the scene within the digital content stream.

16 Claims, 5 Drawing Sheets

(58) Field of Classification Search
CPC .............. G01C 21/3667; G05D 1/0094; G06F 11/3006; G06F 11/3051
See application file for complete search history.

(56) References Cited

U.S. PATENT DOCUMENTS

| | | | | |
|---|---|---|---|---|
| 2003/0142201 | A1* | 7/2003 | Babka | H04N 7/152 348/14.09 |
| 2005/0042999 | A1* | 2/2005 | Rappaport | H04B 1/719 455/307 |
| 2006/0058103 | A1* | 3/2006 | Danieli | A63F 13/87 463/42 |
| 2007/0018952 | A1* | 1/2007 | Arseneau | H04H 40/27 345/156 |
| 2007/0117617 | A1* | 5/2007 | Spanton | A63F 13/12 463/29 |
| 2007/0243934 | A1* | 10/2007 | Little | G07F 17/3213 463/40 |
| 2009/0104954 | A1* | 4/2009 | Weber | G07F 17/3223 463/1 |
| 2009/0104965 | A1* | 4/2009 | House | G06Q 20/3674 463/20 |
| 2009/0233705 | A1* | 9/2009 | LeMay | G07F 17/3223 463/25 |
| 2009/0288140 | A1* | 11/2009 | Huber | H04L 63/0853 726/2 |
| 2009/0300565 | A1* | 12/2009 | Chiu | G06F 30/394 716/113 |
| 2010/0041470 | A1* | 2/2010 | Preisach | G07F 17/32 463/25 |
| 2010/0317437 | A1* | 12/2010 | Berry | G07F 17/3225 463/35 |
| 2013/0246339 | A1* | 9/2013 | Kendrena | G06F 16/2465 707/602 |
| 2013/0300832 | A1* | 11/2013 | Hohteri | H04N 5/262 348/46 |
| 2014/0219230 | A1* | 8/2014 | Schierl | H04W 72/08 370/329 |
| 2014/0371875 | A1* | 12/2014 | Boye | G06Q 10/0631 700/9 |
| 2015/0131545 | A1* | 5/2015 | Ameigeiras Gutierrez | H04W 72/1236 370/329 |
| 2016/0234124 | A1* | 8/2016 | Tomici | H04W 28/24 |
| 2016/0292815 | A1* | 10/2016 | Bell | G06T 1/20 |
| 2017/0072324 | A1* | 3/2017 | Navok | A63F 13/335 |
| 2017/0282063 | A1* | 10/2017 | Krishnamurthy | A63F 13/5375 |
| 2019/0172229 | A1* | 6/2019 | Chan | G06K 9/6267 |
| 2019/0180483 | A1* | 6/2019 | DeLuca | G06T 11/00 |
| 2019/0289479 | A1* | 9/2019 | Simms | H04W 24/02 |
| 2019/0378333 | A1* | 12/2019 | Castaneda | G06K 9/00369 |
| 2020/0016495 | A1* | 1/2020 | Cruz | H04L 65/1069 |

OTHER PUBLICATIONS

PCT/US20/17058, Contextual For Digital Content, Feb. 6, 2020.
PCT Application No. PCT/US2020/017058 International Preliminary Report on Patentabililty dated Aug. 24, 2021.

* cited by examiner

CONTEXTUAL LAYER FOR DIGITAL CONTENT

BACKGROUND OF THE INVENTION

1. Field of the Invention

The present invention generally relates to digital content. More specifically, the present invention relates to providing a contextual layer for digital content.

2. Description of the Related Art

Presently available digital content streams include those that have long and/or complex histories, mythologies, narratives, storylines, backgrounds, terminologies, lexicons, rules, and other contexts. In some cases, such contexts may (eventually) become discernible to a user given enough effort and time. While rich contexts may prolong and deepen engagement with long-time users, complexity may act as a barrier to entry and engagement, however, for new and casual users.

In addition, certain universes—and their storylines and mythologies—may go back years if not decades, as well as extend over different types of digital media (e.g., print, e-books, audio, video including televised episodes and movies, digital games) and multiple titles thereof. A user who is new to such an extended universe may be intimidated by the sheer amount of content, let alone the complex relationships described therein. Such a user may thus find their introduction to a particular content stream confusing and/or frustrating, especially if they are navigating through the stream alone or without the assistance of knowledgeable or experienced friends.

Meanwhile, even long-time users may wish to be able to access contextual data more easily or more immediately during play of digital content. Many digital content streams may not include such contextual data. As such, obtaining contextual data may therefore require access to various information sources, as well as time and effort to formulate queries or otherwise search for the same.

There is, therefore, a need in the art for improved systems and methods of providing a contextual layer for digital content.

SUMMARY OF THE CLAIMED INVENTION

Embodiments of the present invention allow for providing a contextual layer for digital content. Contextual information regarding a digital content stream may be stored in memory. Different sets of the contextual information may be associated with different predefined parts of the digital content stream. A request may be received from a user device over a communication network. Such request may concern context for a scene within the digital content stream, The scene may be identified as associated with at least one of the predefined parts of the digital content stream, One of the stored sets of contextual information may be retrieved based on the at least one predefined part of the digital content stream. A contextual layer may be generated based on the retrieved set of contextual information. Such contextual layer may include a presentation of the retrieved set of contextual information to be overlaid on at least part of the scene within the digital content stream.

Various embodiments of the present invention may include methods for providing a contextual layer for digital content. Such methods may include storing contextual information regarding a digital content stream in memory where different sets of the contextual information is associated with different predefined parts of the digital content stream. Methods may further include receiving a request from a user device over a communication network concerning context for a scene within the digital content stream, identifying that the scene is associated with at least one of the predefined parts of the digital content stream, retrieving one of the stored sets of contextual information based on the at least one predefined part of the digital content stream, and generating a contextual layer that includes a presentation of the retrieved set of contextual information to be overlaid on at least part of the scene within the digital content stream.

Further embodiments of the present invention may include systems for providing a contextual layer for digital content. Such systems may include memory that stores contextual information regarding a digital content stream where different sets of the contextual information is associated with different predefined parts of the digital content stream. Systems may further include a communication interface that receives a request from a user device over a communication network that concerns context for a scene within the digital content stream. In addition, systems may include a processor that identifies that the scene is associated with at least one of the predefined parts of the digital content stream, retrieves one of the stored sets of contextual information based on the at least one predefined part of the digital content stream, and generates a contextual layer that includes a presentation of the retrieved set of contextual information to be overlaid on at least part of the scene within the digital content stream.

Yet further embodiments of the present invention may include non-transitory computer-readable storage media having embodied thereon a program executable by a processor to perform a method for providing a contextual layer for digital content as described above.

BRIEF DESCRIPTIONS OF THE DRAWINGS

DETAILED DESCRIPTION

Embodiments of the present invention allow for providing a contextual layer for digital content. Contextual information regarding a digital content stream may be stored in memory. Different sets of the contextual information may be associated with different predefined parts of the digital content stream. A request may be received from a user device over a communication network. Such request may concern context for a scene within the digital content stream, The scene may be identified as associated with at least one of the predefined parts of the digital content stream, One of the stored sets of contextual information may be retrieved based on the at least one predefined part of the digital content stream. A contextual layer may be generated based on the retrieved set of contextual information. Such contextual layer may include a presentation of the retrieved set of contextual information to be overlaid on at least part of the scene within the digital content stream.

Figure 1:
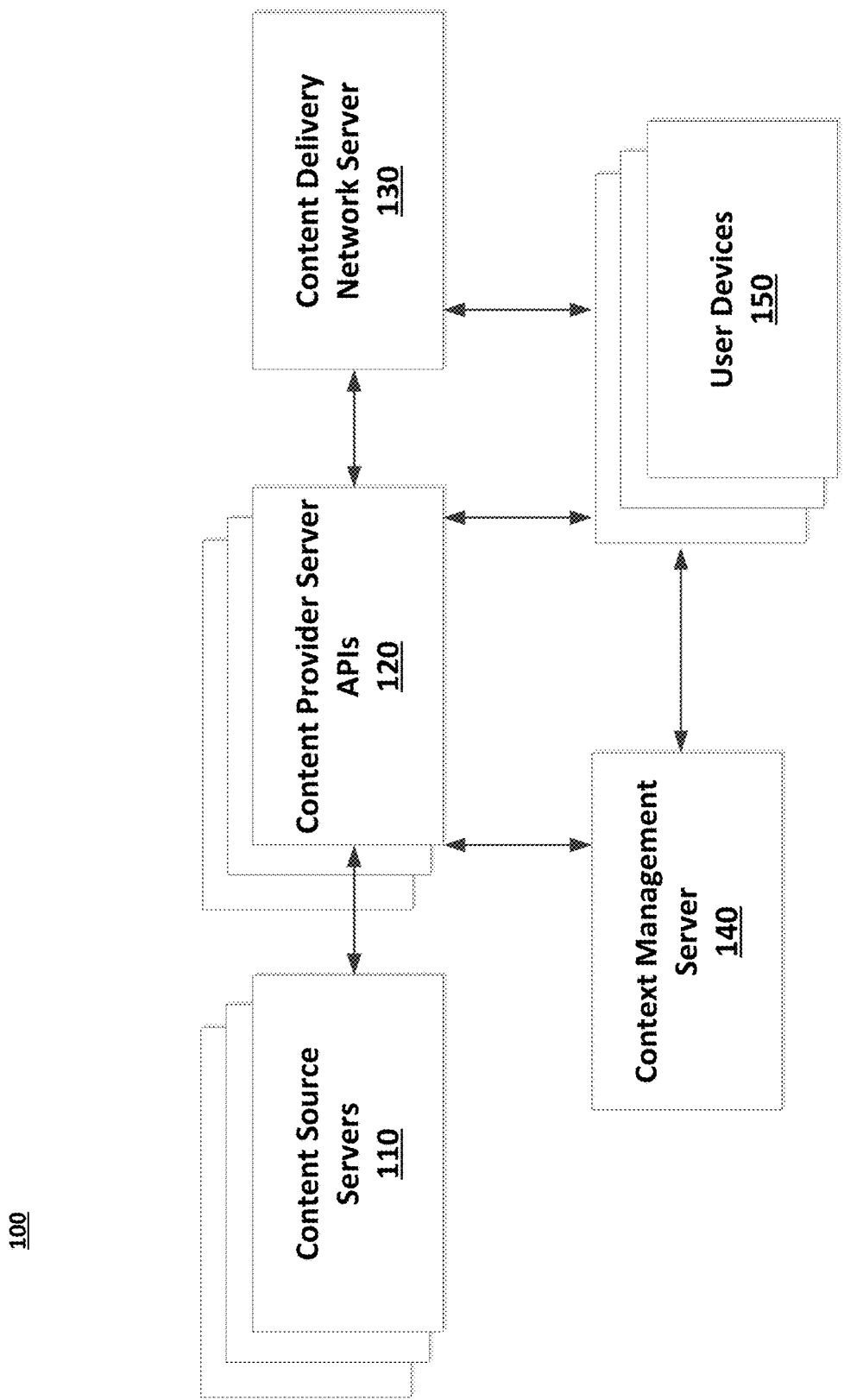
FIG. 1 illustrates an exemplary network environment in which a system for providing a contextual layer for digital content may be implemented.

FIG. 1 illustrates an exemplary network environment 100 in which a system for providing a contextual layer for digital content may be implemented. The network environment 100 may include one or more content source servers 100 that provide digital content (e.g., games, other applications and services) for distribution, one or more content provider server application program interfaces (APIs) 120, content delivery network server 130, a context management server 140, and one or more user devices 150. The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content available for distribution. The content source servers 110 may be associated with any content provider that makes its content available for access over a communication network. Such content may include not only digital video and games, but also other types of digital applications and services. Such applications and services may include any variety of different digital content and functionalities that may be provided to user devices 150.

The content from content source server 110 may be provided through a content provider server API 120, which allows various types of content sources server 110 to communicate with other servers in the network environment 100 (e.g., user devices 150). The content provider server API 120 may be specific to the particular language, operating system, protocols, etc. of the content source server 110 providing the content, as well as the user devices 150. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may use different operating systems, protocols, etc., to process such content. As such, applications and services in different formats may be made available so as to be compatible with a variety of different user device 150.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (i.e. metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Context management server 140 may include any data server known in the art that is capable of managing contextual data for a variety of digital content streams. In an exemplary implementation, context management server 140 manages storage of contextual information for different content streams. When a user device 150 requests context for a current scene within a specific content stream, context management server 140 may identify a specific set of contextual information and generate a contextual layer that presents the identified set of contextual information to be overlaid over the current scene.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a client device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants or other types of spectators of a collection of digital content streams.

In an exemplary implementation, a user device 150 may request a digital content stream hosted by content source server 110. Such request may be made via content delivery network server 130 in conjunction with content provider server APIs 120. Meanwhile, context management server 150 may maintain contextual data regarding the digital content stream. Each digital content stream made available in network environment 100 may be associated with a different body of contextual information, and different sets of that contextual information may be associated with different predefined parts of the digital content stream. For example, a digital game may involve a variety of different players, as well as different in-game objects (inclusive of in-game characters, locations, creatures, weapons, prizes, etc.). Each player and in-game object may be associated with a different set of contextual information. Such contextual information may include information regarding histories, mythologies, narratives, storylines, backgrounds, biographies, terminologies, lexicons, rules, objectives, statistical data, related works, instruction manuals, guides, hyperlinks, commentaries, and other associated media.

A user device 140 that is streaming a particular digital content stream may make a request for context while a specific scene of the digital content stream is currently played. Such stream may or may not be paused in response to the contextual request. Where the requestor is the player, for example, the stream may be paused to allow the player to review the contextual information presented in the contextual layer. Some spectators, however, may prefer to allow the stream to keep playing the background, while the contextual layer is presented (e.g., as a partial or translucent overlay). In some embodiments, the contextual layer may be updated in real-time as the digital content stream continues to play.

Context management server 140 may identify that the request is associated with the specified scene within the digital content stream and further that the specified scene is associated with at least one of the predefined parts of the digital content stream. For example, the scene may include a character holding a weapon and fighting a creature. Within the body of contextual data for the digital content stream, different sets of contextual data may be identified as providing context regarding the character, weapon, and creature, respectively. Parts of the contextual data sets may be related (e.g., applicable rules, scoring systems, and respective abilities in combat). Analyses of the scene in order to identify which contextual data sets to retrieve may further include image analyses, audio/voice analyses (e.g., identified keywords), metadata analyses regarding current status, and other analyses. For interactive and game content, game data (including metadata) may be provided from content source server 110 and/or content delivery server 130 regarding current game status for the current scene within the digital content stream. Where the digital content stream may be associated with audio commentary, for example, the content of the commentary may also be analyzed in accordance with the foregoing techniques. The current scene may further be identified by reference to the point in time at which the current scene appears or a location within a virtual universe where the current scene is set.

Context management server 140 may then retrieve one or more of the stored sets of contextual information based on at least one predefined part (e.g., character, weapon, creature) found in the scene. In some embodiments, the current scene of the digital content stream may include multiple objects, and the behavior of the user device 140 in making the request may specifically indicate a selection among the objects. In such instance, the context management server 140 may prioritize retrieval of the set of contextual information associated with the selected object. As discussed in further detail below, the retrieved set(s) of contextual information may be used to generate a contextual layer. Where there are multiple objects and a selection therefrom, different contextual layers—based on different sets of contextual data retrieved or different layouts—may be generated based on different selections.

Referring to the earlier exemplary scene involving the specific character, weapon, and creature, context management server 140 may retrieve the associated sets of contextual data for use generating a contextual layer that presents the contextual data identified as relevant to the character, weapon, and creature depicted in the specific scene. For digital content streams that are interactive (e.g., game), such contextual data ya further include information regarding how the scene fits into the game title generally, current game session/status, game objectives, and other game-related contexts. Such contextual data may be incorporated into and presented by the contextual layer in a variety of ways.

Figure 2:
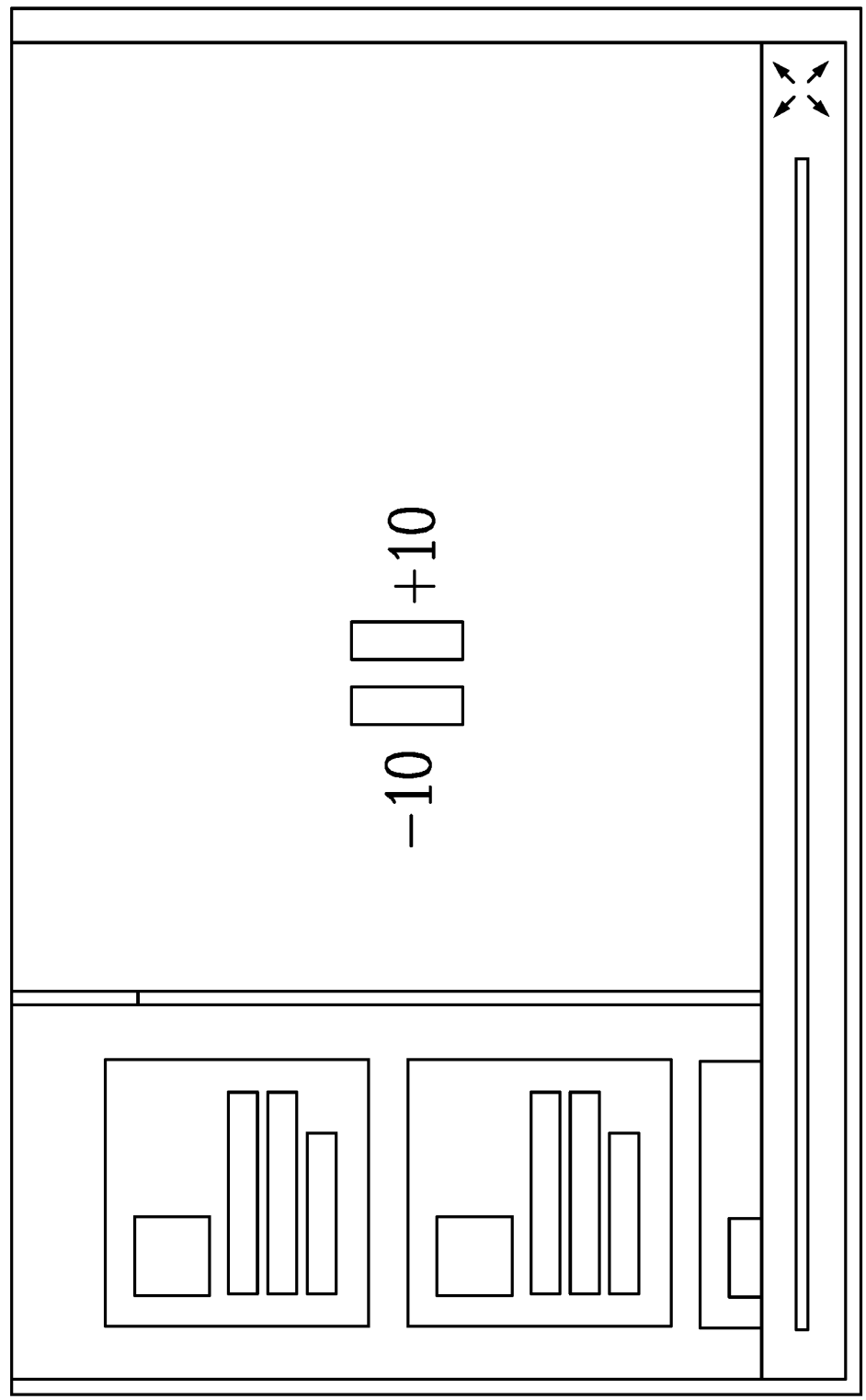
FIG. 2 is a diagram of an exemplary contextual layer for digital content that may be provided in accordance with embodiments of the present invention.

FIG. 2 is a diagram of an exemplary contextual layer 200 for digital content that may be provided in accordance with embodiments of the present invention. As illustrated, such contextual layer 200 may be configured as an overlay for a window display of digital content. The diagram of FIG. 2 illustrates a play bar, which may be used to navigate within the digital content stream, as well as play/pause, skip forward (e.g., +10), and skip back (e.g., −10) options. In addition, the contextual layer 200 includes a series of boxes on the left-hand side, which may be used to present contextual data. The layout illustrated for contextual layer 200 in FIG. 2 is exemplary, however, and the contextual data may be presented in a variety of different layouts for content overlays as known in the art.

Figure 3A:
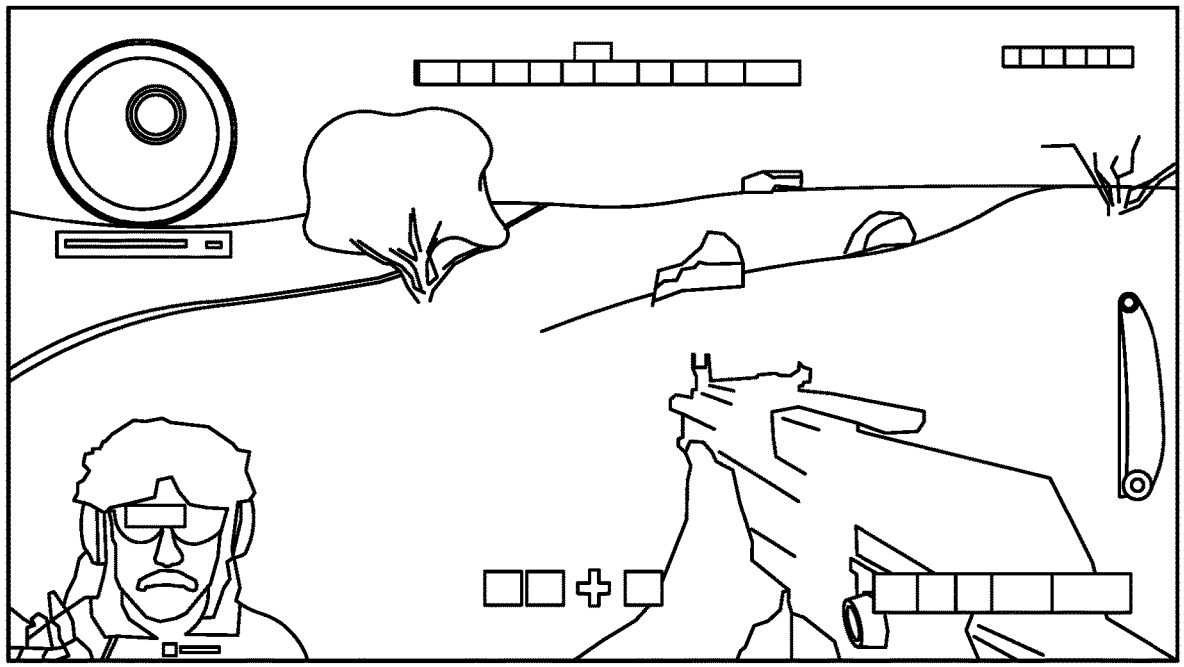
FIG. 3A is a screenshot illustrating an exemplary scene that may be displayed during play of digital content.
Figure 3B:
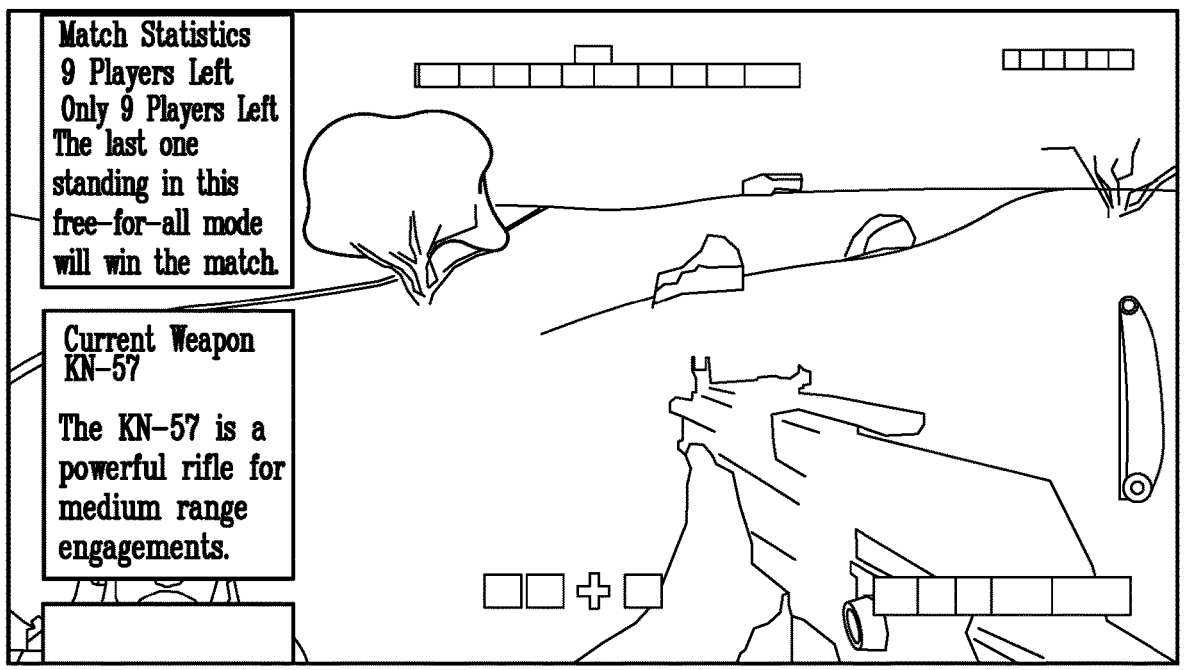
FIG. 3B is a screenshot illustrating an exemplary contextual layer that may be provided for the scene of FIG. 3A.

FIG. 3A is a screenshot illustrating an exemplary scene that may be displayed during play of digital content, and FIG. 3B is a screenshot illustrating an exemplary contextual layer that may be provided for the scene of FIG. 3A. The scene illustrated FIG. 3A is from a digital content stream associated with the game title "Call of Duty: Blackout." Such a stream may be accessed by a spectator device (e.g., user device 150), who requests context for the current scene. FIG. 3G illustrates the exemplary contextual layer with information cards containing current game data identified as being relevant to the current scene, specifically the current status of players, current objective, and the current weapon.

In some embodiments, the generated contextual layer may be further curated and/or customized in accordance with different parameters and preferences. For example, context management server 140 may further store or access historical or statistical data regarding previous interactions by a plurality of user devices with the digital content stream. Such data may be used as a basis for identifying or prioritizing that the scene is associated with a specific set of contextual data. Such prioritized dataset may be presented more prominently within the contextual layer generated by context management server 140. Further, context management server 140 may make a prediction regarding a future interaction with the digital content stream based on the historical or statistical data. Such prediction may also be presented in the contextual layer, as well as used as a basis for filtering or customizing related sets of data within the presentation of the contextual layer. Different users of user devices 150 may also be associated with user profiles that include preferences and other user data (e.g., skill level, experience level, games played, designated team members and friends, express interests). Such profile data may also be used to customize a contextual layer (e.g., prioritizing or making more prominent the contextual information that is related to the profile data).

Figure 4:
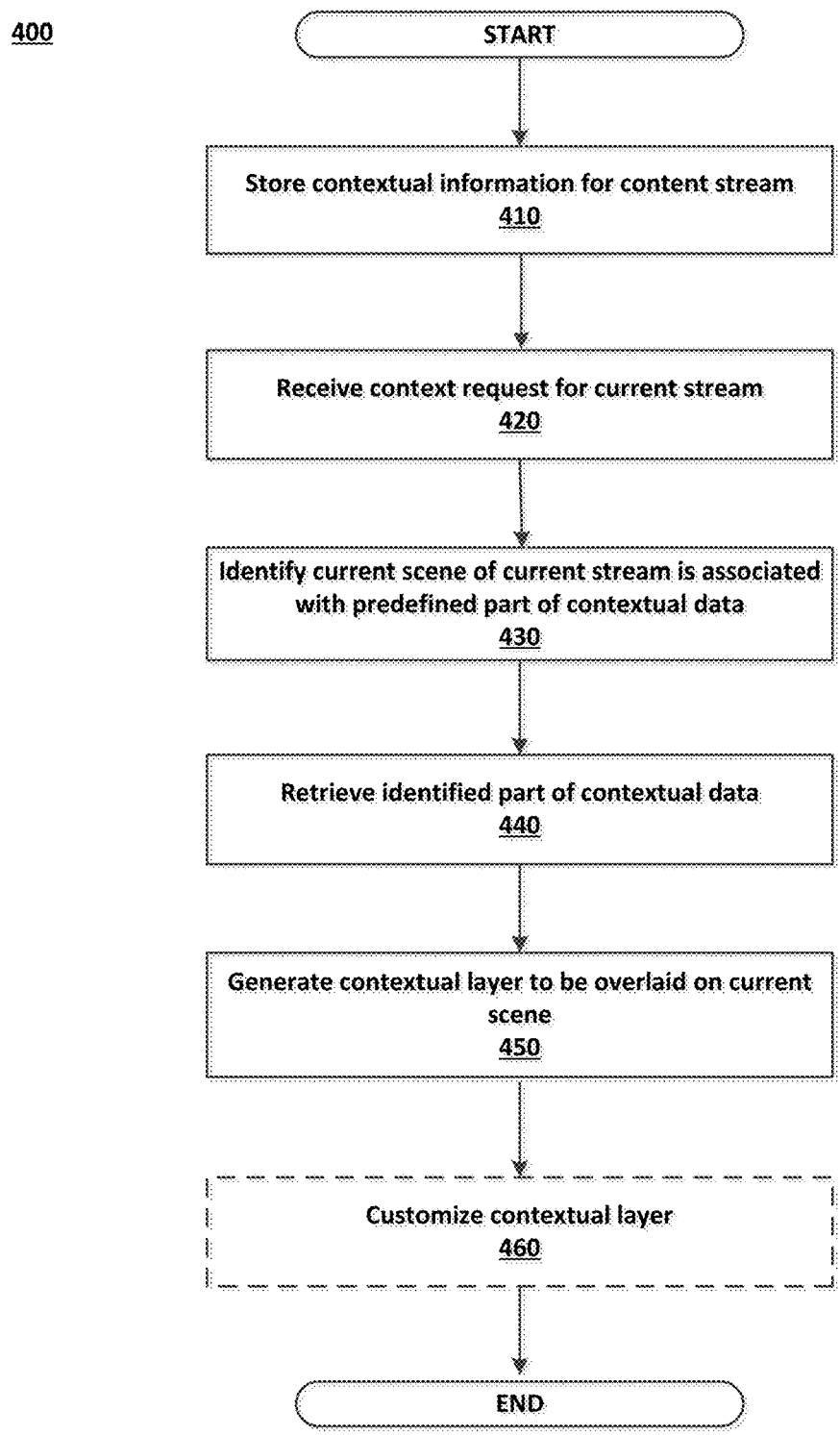
FIG. 4 is a flowchart illustrating an exemplary method of providing contextual layer for digital content.

FIG. 4 is a flowchart illustrating an exemplary method 400 of providing contextual layer for digital content. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 4 (and the order thereof) are exemplary and may include various alternatives, equivalents, or derivations thereof including but not limited to the order of execution of the same.

In method 400 of FIG. 4, contextual information regarding a digital content stream may be stored in memory. Different sets of the contextual information may be associated with different predefined parts of the digital content stream. A request may be received from a user device over a communication network. Such request may concern context for a scene within the digital content stream, The scene may be identified as associated with at least one of the predefined parts of the digital content stream, One of the stored sets of contextual information may be retrieved based on the at least one predefined part of the digital content stream. A contextual layer may be generated based on the retrieved set of contextual information. Such contextual layer may include a presentation of the retrieved set of contextual information to be overlaid on at least part of the scene within the digital content stream.

In step 410, information regarding contextual datasets may be stored and managed by context management server 140. In some embodiments, contextual information may also be stored at content source servers 110, content delivery network servers 130, and other data sources (e.g., various websites). Each digital content stream may therefore be associated with a body of contextual data stored in different locations, and different sets of the contextual information with that body may be associated with different predefined parts (e.g., points in time, virtual location, character, weapons, other objects, etc.) of the digital content stream. The information stored by context management server 140 includes information regarding where different sets of the contextual information is stored so as to allow for retrieval of the same as needed.

In step 420, a request may be received from a user device 150 over a communication network. Such user device may be streaming a specific digital content stream and have made the request in association with a specific scene. Various types of data and metadata regarding the specified scene may be included in the request or may be accessed from content source server 110 (or content delivery network server 130). Some analysis—image analysis or audio analysis—may also be performed to identify the scene and its contents.

In step 430, context management server 140 may identify that the scene is associated with at least one of the predefined parts of the digital content stream. Such parts may include specific characters, weapons, creatures, and other objects, etc., depicted with the scene. In certain interactive digital content titles, the parts may further include current game status, game level, and relationships to certain objectives. Once the scene is identified as including certain component parts, such parts may be correlated to specifically identified sets of contextual data.

In step 440, context management server 140 retrieves the specifically identified sets of contextual information from their respective storage locations. As noted above, the sources for the contextual information may be varied, and as such, the context management server 140 may retrieve different datasets from multiple different storage locations based on the identified parts of the scene indicated by the request.

In step 450, context management server 140 generates a contextual layer based on the retrieved set(s) of contextual information. The generated contextual layer may include a presentation of the retrieved set of contextual information to be overlaid on at least part of the scene within the digital content stream. Such overlay may exhibit different degrees of translucency, so that viewer can see the underlying scene in conjunction with the presented contextual information. In some instances, the contextual layer may only overlay part of the scene. Context management server 140 may also configure the presentation of the contextual information around the content of the scene, so as not to obscure the same. Other layouts for the contextual layer may include a designated area of the screen to be used for the retrieved set of contextual information.

In step 460, the contextual layer may be customized to the requesting user via a profile indicative of certain preferences and parameters. Such preferences and parameters may be used to filter the retrieved contextual information, as well as to select different configurations and prioritize different retrieved sets of contextual information.

Figure 5:
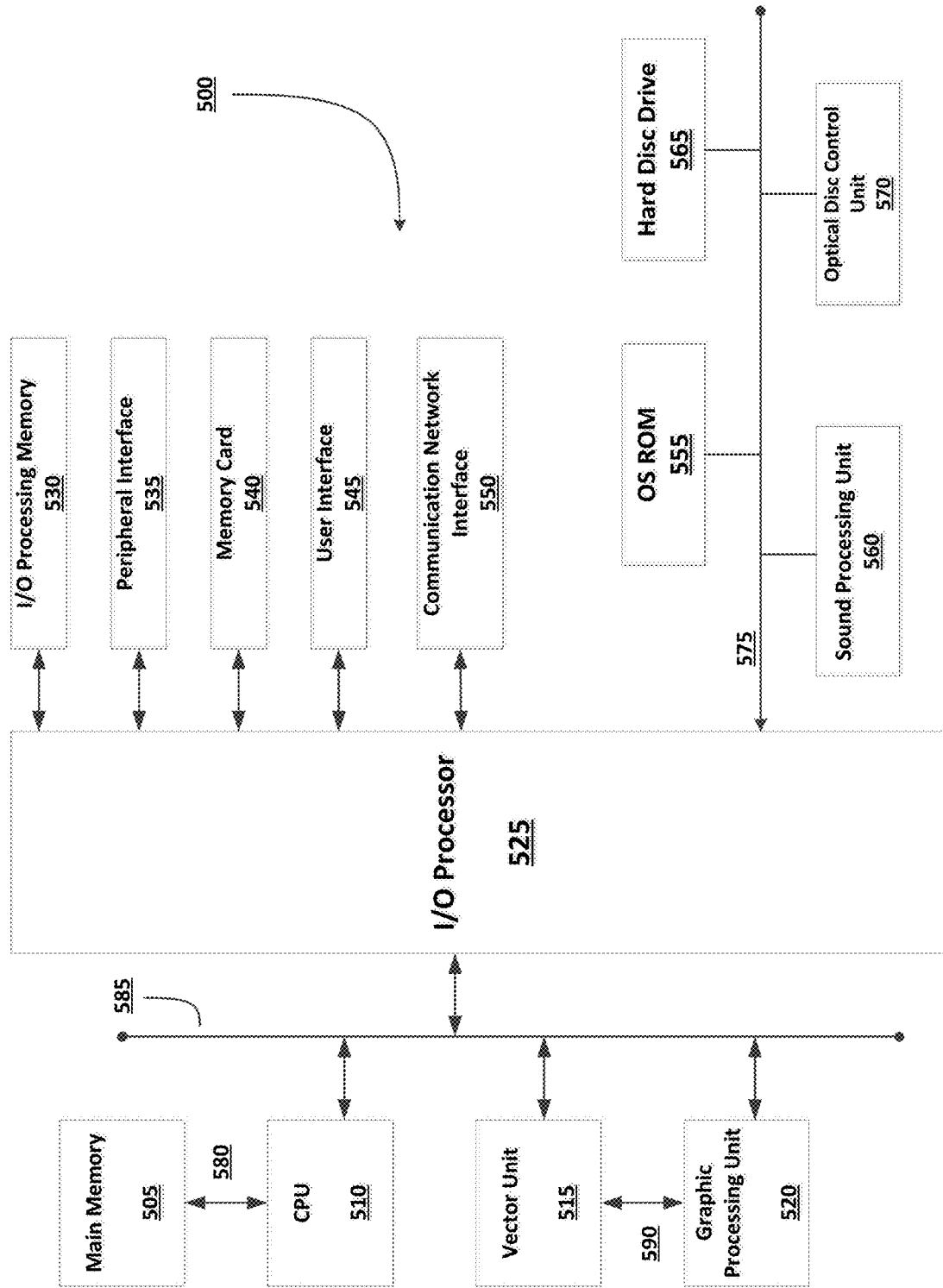
FIG. 5 is an exemplary electronic entertainment system that may be used to provide a contextual layer for digital content.

FIG. 5 is an exemplary client electronic entertainment system that may be used in the present invention. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 5G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for providing a contextual layer for digital content, the system comprising:
   a memory that stores:
      contextual information regarding a digital content stream, wherein different sets of the contextual information are associated with different predefined parts of the digital content stream;
      a user profile that includes one or more prioritization parameters regarding the contextual information; and
      metadata generated in real-time regarding interaction with the digital content stream;
   a communication interface that receives a request sent over a communication network from a spectator device associated with a spectator of the digital content stream, wherein the request is associated with the user profile and concerns context for a specified scene within the digital content stream; and
   a processor that executes instructions stored in memory in response to the request from the spectator device, wherein execution of the instructions by the processor:
      identifies that the specified scene is associated with at least one of the predefined parts of the digital content stream,
      retrieves one or more of the stored sets of contextual information associated with the at least one predefined part of the digital content stream,
      prioritizes the retrieved sets of contextual information in accordance with the one or more prioritization parameters in the user profile,
      makes a prediction regarding future interaction with the digital content stream based on historical data or statistical data,
      generates a contextual layer for the digital content stream provided to the spectator device, wherein generating the contextual layer includes filtering the prioritized sets of contextual information based on the prediction, and wherein the generated contextual layer includes a presentation of at least the filtered sets of contextual information to be overlaid on at least part of the scene within the digital content stream, and
      identifies that the scene is associated with the at least one predefined part based on the metadata.

2. The system of claim 1, wherein one or more predefined parts of the digital content stream includes one or more digital objects.

3. The system of claim 2, wherein each of the digital objects is associated with a respective set of contextual information.

4. The system of claim 3, wherein the request from the spectator device concerns a digital object selected from among the one or more digital objects.

5. The system of claim 1, wherein the memory further stores the historical or statistical data regarding previous interactions by a plurality of user devices with the digital content stream, and wherein the processor identifies that the scene is associated with the at least one predefined part based on the historical or statistical data.

6. The system of claim 1, wherein the request specifies a point in time or virtual location associated with the scene within the digital content stream.

7. The system of claim 6, wherein the processor further identifies that the scene is associated with the at least one predefined part based on the specified point in time or specified virtual location.

8. A method for providing a contextual layer for digital content, the method comprising:
   storing in memory:
      contextual information regarding a digital content stream, wherein different sets of the contextual information are associated with different predefined parts of the digital content stream,
      a user profile that includes one or more prioritization parameters regarding the contextual information, and
      metadata generated in real-time regarding interaction with the digital content stream;

receiving a request sent over a communication network from a spectator device associated with a spectator of the digital content stream, wherein the request is associated with the user profile and concerns context for a specified scene within the digital content stream; and executing instructions stored in memory in response to the request from the spectator device, wherein execution of the instructions by a processor:

identifies that the specified scene is associated with at least one of the predefined parts of the digital content stream, wherein identifying that the scene is associated with the at least one predefined part is based on the metadata, retrieves one or more of the stored sets of contextual information associated with the at least one predefined part of the digital content stream, prioritizes the retrieved sets of contextual information in accordance with the one or more prioritization parameters in the user profile, makes a prediction regarding future interaction with the digital content stream based on historical data or statistical data, and generates a contextual layer for the digital content stream provided to the spectator device, wherein generating the contextual layer includes filtering the prioritized sets of contextual information based on the prediction, and wherein the generated contextual layer includes a presentation of at least the filtered sets of contextual information to be overlaid on at least part of the scene within the digital content stream.

9. The method of claim 8, wherein one or more predefined parts of the digital content stream includes one or more digital objects.

10. The method of claim 9, wherein each of the digital objects is associated with a respective set of contextual information.

11. The method of claim 10, wherein the request from the spectator device concerns a digital object selected from among the one or more digital objects.

12. The method of claim 8, further comprising storing the historical or statistical data regarding previous interactions by a plurality of user devices with the digital content stream, wherein identifying that the scene is associated with the at least one predefined part is based on the historical or statistical data.

13. The method of claim 8, wherein the request specifies a point in time or virtual location associated with the scene within the digital content stream.

14. The method of claim 13, wherein identifying that the scene is associated with the at least one predefined part is based on the specified point in time or specified virtual location.

15. A non-transitory computer-readable storage medium, having embodied thereon a program executable by a processor to perform a method for providing a contextual layer for digital content, the method comprising:

storing:
contextual information regarding a digital content stream, wherein different sets of the contextual information are associated with different predefined parts of the digital content stream, a user profile that includes one or more prioritization parameters regarding the contextual information, and metadata generated in real-time regarding interaction with the digital content stream;

receiving a request sent over a communication network from a spectator device associated with a spectator of the digital content stream, wherein the request is associated with the user profile and concerns context for a specified scene within the digital content stream;

identifying, in response to the request from the spectator device, that the specified scene is associated with at least one of the predefined parts of the digital content stream, wherein identifying that the scene is associated with the at least one predefined part is based on the metadata;

retrieving one or more of the stored sets of contextual information associated with the at least one predefined part of the digital content stream;

prioritizes the retrieved sets of contextual information in accordance with the one or more prioritization parameters in the user profile;

makes a prediction regarding future interaction with the digital content stream based on historical data or statistical data; and generates a contextual layer for the digital content stream provided to the spectator device, wherein generating the contextual layer includes filtering the prioritized sets of contextual information based on the prediction, and wherein the generated contextual layer includes a presentation of at least the filtered sets of contextual information to be overlaid on at least part of the scene within the digital content stream.

16. The system of claim 1, wherein the prioritized set of contextual information is displayed above the retrieved sets of contextual information within the generated contextual layer.

* * * * *